United States Patent
Gavish et al.

(12)

(10) Patent No.: US 6,310,682 B1
(45) Date of Patent: Oct. 30, 2001

(54) SYSTEM AND METHOD FOR LASER RANGE FINDER

(75) Inventors: Moshe Gavish, Kiryat-Bialik (IL); Kuo-Tso Chen, Hsin-Chu (TW)

(73) Assignees: Quarton, Inc. (TW); Segnetron Israel, Ltd. (IL)

( * ) Notice: Subject to any disclaimer, the term of this patent is extended or adjusted under 35 U.S.C. 154(b) by 0 days.

(21) Appl. No.: 09/347,976

(22) Filed: Jul. 6, 1999

(51) Int. Cl.$^7$ .............................. G01C 3/08; G01S 13/08
(52) U.S. Cl. ............................... 356/5.01; 342/134
(58) Field of Search .................. 356/5.01–5.08; 342/134

(56) References Cited

U.S. PATENT DOCUMENTS 3,830,567 * 8/1974 Riegl .
5,739,901 * 4/1998 Fujioka et al. ................. 356/5.01

* cited by examiner

*Primary Examiner*—Stephen C. Buczinski
(74) *Attorney, Agent, or Firm*—Raymond Sun (57) ABSTRACT

The actual value of a parameter from a laser range finder to a target is determined by adjusting the measured parameter by a measurement error. The error adjustment is based on the relationship between the intensity of the detected pulse and the expected parameter error. The laser range finder has a laser diode for emitting a laser pulse to a target to produce a reflected pulse, and a detector for receiving the reflected pulse. A measurement circuit is coupled to the detector for determining a measured parameter based on the reflected pulse. An integrator is coupled to the detector for determining the pulse area, and therefore, the intensity of the reflected pulse. A processor is coupled to the measurement circuit and the integrator for adjusting the measured parameter based on the pulse area of the reflected pulse, to provide the actual value of the parameter.

17 Claims, 6 Drawing Sheets

SYSTEM AND METHOD FOR LASER RANGE FINDER

BACKGROUND OF THE INVENTION

1. Field of the Invention

The present invention relates to laser range finders designed for measuring parameters, and in particular, to a laser range finding apparatus in which measurements are based on the calculation of the time of flight of laser pulses.

2. Description of the Prior Art

Presently available conventional time of flight laser range finders utilize GaAs semiconductor lasers operated by driving high peak currents of 10–100 amps and short duration pulses (typically 5–500 nanoseconds time width) through the laser diode. In most conventional low cost laser-diode based systems, a high voltage switching power supply is used to charge an energy storage capacitor, whose electrical energy is discharged through the laser diode whenever a laser pulse is to be transmitted.

When using time of flight to measure distances, the time of flight is the time needed for a laser pulse to travel from the laser range finder to the target and back. Here, "reflected pulse" means a laser pulse that has been reflected from a target, and "detected pulse" means a reflected pulse that has been detected at a detection unit. The exact arrival time of the detected pulse at the laser range finder's detection unit is determined by the amount of time needed for an electrical pulse (generated by the detection unit in response to the detected pulse) to cross a predetermined threshold voltage. The predetermined threshold voltage is set at a sufficiently high level to distinguish the detected pulse from environmental noise.

Figure 1A:
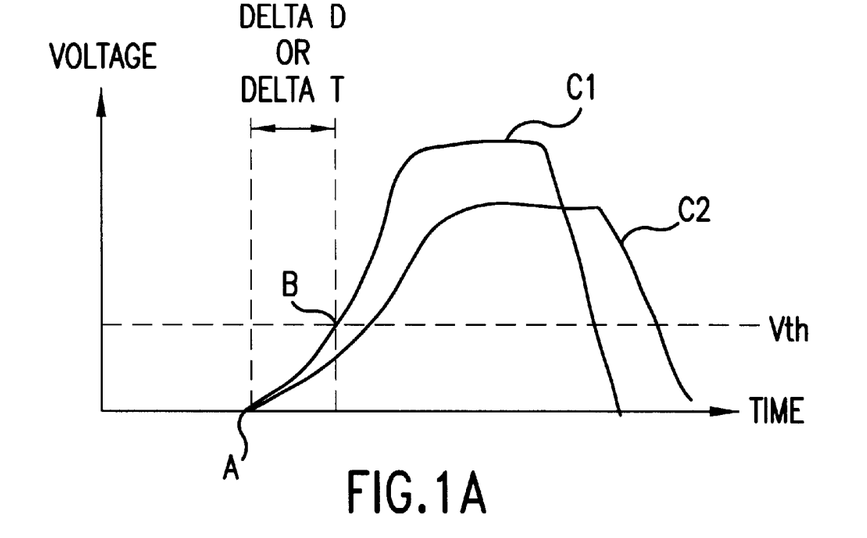
FIG. 1A illustrates the voltage level of detected pulses as the pulses are received at a conventional detection unit.

While this concept is theoretically simple, in practice, it is more difficult to obtain accurate readings due to the variability of a number of environmental factors. For example, different targets can have different colors and be positioned in different environments having different backgrounds. Different colors and background may affect the intensities of the reflected laser pulses. Therefore, even if the distances from the laser range finder to a first target and to a second target are identical, the detected pulses from the first and second targets ay cross the threshold voltage at different times. This is illustrated in FIG. 1A, where the curve C1 represents the voltage level of the detected pulse, and Vth is the predetermined threshold voltage. As shown in FIG. 1A, the reflected pulse is detected at point A, but there will be a time difference (delta T) between the time the reflected pulse is detected (point A) to the time (point B) when the voltage level of the detected pulse rises above the threshold voltage, which also reflects a distance difference (delta D). This time difference (delta T) can vary depending on the intensity of the reflected pulse. This is illustrated with curve C2, which is a detected pulse having a different intensity from the pulse of C1, which rises above the threshold voltage at a different time. This variation can even be as great as up to six orders of magnitude in the pulse intensities versus measured range for the detected pulse.

To overcome these inaccuracies, several laser range finder systems have been proposed and developed to obtain and improve the measurement accuracy of the time of flight, and to overcome the large variations in the parameters of the detected pulses.

One such system uses a constant threshold that is set above the noise level of the system's detection unit. The threshold voltage and the electrical output of the detection unit are both provided to a fast comparator. When a detected pulse exceeds the threshold, a stop signal is provided to a time counter and the distance is computed. Unfortunately, this system does not adequately address the phenomenon of varying intensities of the detected pulse, since errors can still be introduced if the detected pulses cross the threshold at different times due to different intensities of the detected pulse.

Another proposed system uses a constant fraction detector (CFD) to compensate for the varying intensities of the detected pulse. The threshold is made to vary as a fixed fraction of the amplitude of the detected pulse. A delay line is used to enable the CFD. A delay is introduced to allow another circuit to calculate the intensity of the detected pulse, so that the final pulse can be normalized. Further details are provided in Burns R. N., et al., "System Design Of A Pulsed Laser Range Finder", Optical Engineering 30(3), 323–329, March 1991.

Yet another proposed system uses a differentiator method, in which the derivative of the pulse amplitude of the detected pulse is compared to 0. This is a special case of the CFD where the fraction is 1, and an electronic derivative is used instead of a delay line. See, for example, Torreieri D. J., "Arrival Time Estimates By Adaptive Thresholding", IEEE Trans. Vol. AES-10, 178–184, March 1974.

The above-described CFD methods (as well as most other known CFD methods) work under a basic principle of "gain change of amplifier". Unfortunately, most of these CFD methods suffer from one or more of the following drawbacks. First, the CFD systems usually include complex circuitry and can be expensive to implement. Second, for changing the gain of an amplifier, these CFD methods will have different output delay times for different input signal intensities (as explained in connection with FIG. 1A above), so that the "gain delay" may result in distance errors (i.e., delta D) during measurement. Third, the noise of a fraction of a detected pulse is added to the noise of the delayed detected pulse, thereby reducing the sensitivity of the laser range finder and reducing the maximum range at which the laser range finder can measure time of flight with specific accuracy.

Thus, there still remains a need for an advanced solution to a laser range finder that overcomes the above-mentioned drawbacks, and that improves the accuracy, reliability and efficiency of time of flight measurement.

SUMMARY OF THE DISCLOSURE

The present invention determines the actual value of a parameter, such as distance, from a laser range finder to a target by adjusting the measured parameter by a measurement error. The error adjustment is based on the relationship between the intensity of the detected pulse and the expected parameter error.

The objects of the present invention may be accomplished by providing a laser range finder having a laser diode for emitting a laser pulse to a target to produce a reflected pulse, and a detector for receiving the reflected pulse. A measurement circuit is coupled to the detector for determining a measured parameter based on the reflected pulse. An integrator is coupled to the detector for determining the pulse area, and therefore the intensity, of the reflected pulse. A processor is coupled to the measurement circuit and the integrator for adjusting the measured parameter based on the pulse area of the reflected pulse, to provide the actual value of the measured parameter.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known circuits and components are omitted so as to not obscure the description of the present invention with unnecessary detail.

The present invention utilizes the following basic principle in determining the actual distance from a laser range finder to a target:

$$D_{actual} = D_{measurement} \pm \text{delta } D \quad (1)$$

Figure 1B:
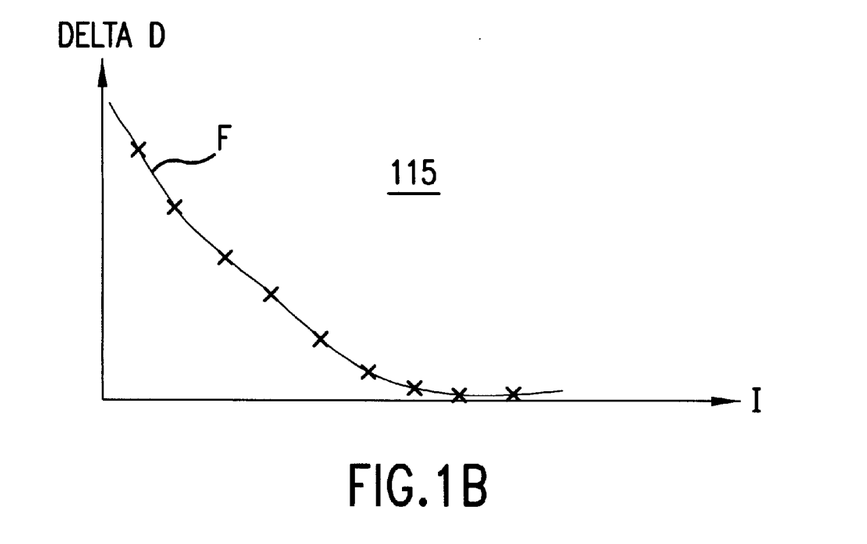
FIG. 1B illustrates the relationship between the intensity of a detected pulse and the expected distance error as utilized by the laser range finder of the present invention.

In other words, the actual distance is determined by adjusting the measured distance by a measurement distance error (i.e., delta D). The error adjustment is based on the relationship between the intensity of the detected pulse and the expected distance error. This relationship function is shown in FIG. 1B, where the curve F represents the function between the intensity of the detected pulse (see "I" on the x-axis) and the expected distance error (see delta D on the y-axis). As shown in FIG, 1B, the greater the intensity, the smaller the expected distance error. The values of the curve F can be pre-calibrated using trial-and-error measurements, and these values can be stored in a look-up table or memory 115 (such as a ROM) that can be located either inside or outside the CPU (such as 111 described below).

Figure 2:
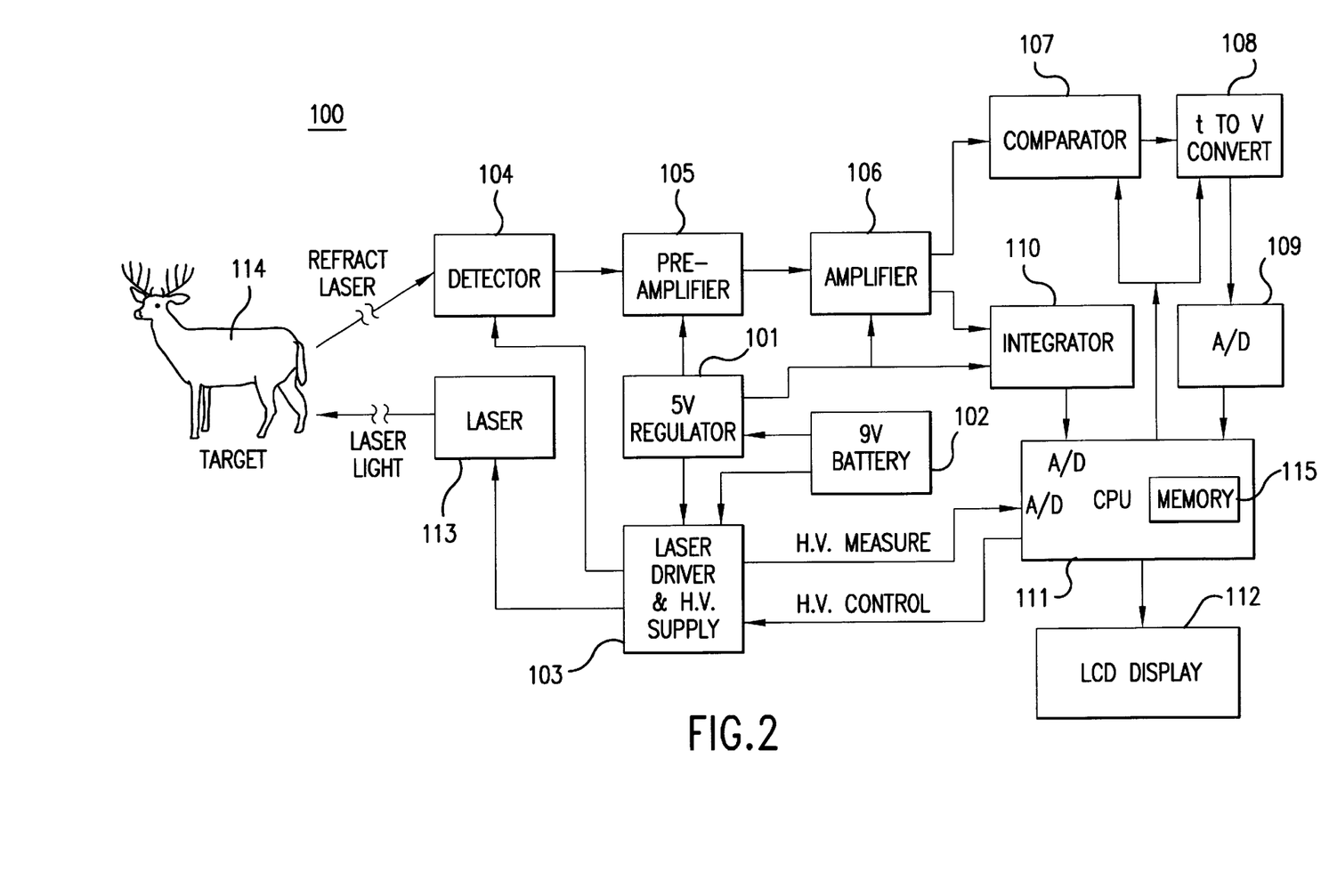
FIG. 2 is a schematic block diagram of a laser range finder according to one embodiment of the present invention.

FIG. 2 illustrates a laser range finder 100 according to one embodiment of the present invention. The laser range finder 100 has a laser diode 113 which emits laser beams or pulses towards a reflecting target 114, which is the object whose distance is to be measured. The laser diode 113 is actually part of the laser driver 103 (described below), but is illustrated separately in FIG. 2 for ease of illustration and understanding. The laser pulses are reflected from the target 114 and received by a detector 104 (described below) as detected pulses. The detected pulses are provided to a microprocessor or CPU 111 (described below) that reads the time of travel of each laser pulse from the time that laser pulse leaves the laser diode 113 to the time it is detected by detector 104. The CPU 111 calculates the distance from the laser range finder 100 to the target 114 using the error adjustment method described below, and provides the actual distance ($D_{actual}$) to be displayed by a display 112 that can be provided on an external panel of the laser range finder 100.

The laser range finder 100 includes a 5V regulator 101 that supplies low voltage power to a pre-amplifier 105, an amplifier 106, an integrator 110, and a laser driver 103. A battery 102 (such as a 9V battery) has an output coupled to the regulator 101 and the laser driver 103 for supplying power thereto. The laser driver 103 has inputs coupled to receive outputs of the regulator 101, battery 102 and CPU 111, and outputs coupled to the CPU 111 and a detector 104 to provide high voltage to the detector 104. The detector 104 receives the detected pulse, and uses high voltage bias for faster operation. Non-limiting examples for the detector 104 can include a photodetector or a photodiode.

Figure 5:
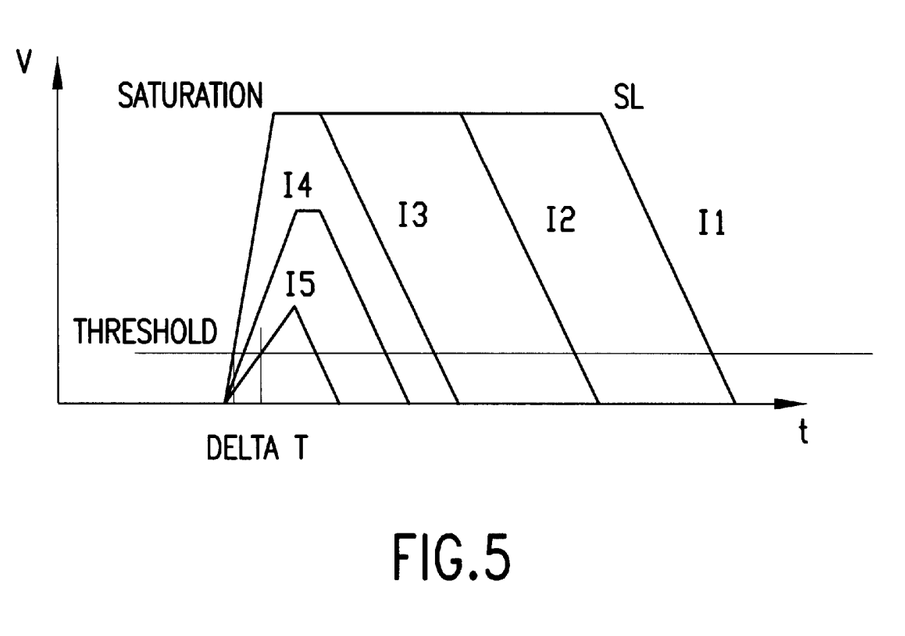
FIG. 5 illustrates the pulse intensities as seen by the integrator of FIG. 4.

From the detector 104, the detected pulse signal is provided to an amplification system that can include an amplifier 106, and optionally also include a preamplifier 105. In the embodiment of FIG. 2, the preamplifier 105 has its inputs coupled to an output of the regulator 101 and the output of detector 104, and the amplifier 106 has its inputs coupled to an output of the regulator 101 and the output of preamplifier 105. The amplification system operates to amplify the detected pulse signals, since the incoming pulse signal is usually too small to be effective in the processing that needs to be done. To obtain sufficient amplification for the signal from long-distance targets, there must be large gain in the signal. Since each amplifier has its own output limit, the amplification system can also operate to "saturate" the condition of the detected pulse signal at short ranges (i.e., distances) or strong reflections. The concept of "saturation" can be understood as follows. Each amplifier has its own output limit. When an input signal is multiplied with the gain of an amplifier, the result is either greater or smaller than the amplifier's output limit. When the result is smaller than the amplifier's output limit, the output signal will be merely the input signal multiplied with the gain. But when the result is greater than the amplifier's output limit, the amplifier can only sustain the amplifier's output limit, so that the output signal will be equal to the amplifier's output limit. In other words, by exceeding the amplifier's output limit, the output signal becomes "saturated". Saturation is inherent, in that it is something that can happen naturally, even without amplification. Referring to FIG. 5, for example, the line SL represents the saturation voltage level for a given amplifier.

An integrator 110 has inputs coupled to outputs of the amplifier 106 and the regulator 101, and an output coupled to the CPU 111. The integrator 110 determines the mathematical "integral" of the pulse area of the detected pulse signal from the amplifier 106, which will provide the intensity of the detected pulse signal. This intensity data is then provided to the CPU 111 so that the CPU 111 can access the memory 115 of FIG. 1B to find the corresponding distance error for that intensity. The integrator 110 and its operation are described in greater detail in connection with FIG. 4.

A comparator 107 has an input coupled to an output of the amplifier 106 for determining whether a detected pulse exceeds a predetermined voltage threshold (such as Vth). A time to voltage (TV) converter 108 has an input coupled to the output of the comparator 107, and obtains both: (1) the voltage level which is proportional to the time T(received), with T(received) being equal to the time taken for a laser pulse to be emitted from the laser diode 113 to the time the input signal crosses the reference voltage level Vth in comparator 107, and (2) the approximate "range" that the target 114 is located at. If a high accuracy A/D converter 109 (described in greater detail below) is used, only one "range" is required. However, to minimize the cost of the circuit, the laser range finder 100 can be programmed for different ranges. For example, the laser range finder 100 can be programmed so that 0–30 meters is considered to be a first range, 30–100 meters is considered to be a second range, 100–400 meters is considered to be a third range, and so on. TV converter 108 can be provided with different current sources and capacitor pairs for different ranges, so as to facilitate use with a less expensive A/D converter 109. Thereafter, once the range is known, the laser range finder 100 can justify the proportion between the time T(received) and the output voltage from the TV converter 108 by changing the current sources and capacitor pairs inside the TV converter 108 for the different "range" used, followed by re-measurement to obtain more accurate results using a less expensive A/D converter 109. As a result, the laser range finder 100 can determine the exact distance within the correct range. For example, the CPU 111 can automatically select a desired parameter or data from the memory 115 of FIG. 1B based on the determined range. The parameter or data can be different for different ranges.

As an alternative, the TV converter 108 can be modified so that the distance can be characterized by only one range (as opposed to being divided by a plurality of ranges) by using a high accuracy A/D converter 109, as explained above.

The TV converter 108 has an output coupled to an input of an analog to digital (A/D) converter 109, which operates to convert the voltage amplitude (that represents the distance information) from the TV converter 108 from analog to digital format. In the laser range finder 100 of FIG. 2, the comparator 107, TV converter 108, and A/D converter 109 together operate as a distance measurement circuit to generate the measured distance ($D_{measurement}$)

However, as described above, the measured distance ($D_{measurement}$) needs to be adjusted by the expected distance error (delta D) to obtain the actual distance $D_{actual}$. Therefore, the A/D converter 109 has an output coupled to the CPU 111 to provide the measured distance ($D_{measurement}$) to the CPU 111. CPU 111 also has inputs coupled to the integrator 110 and the laser driver 103, and operates to access the memory 115 of FIG. 1B to obtain the expected distance error (delta D) corresponding to the intensity calculated by the integrator 110. The CPU 111 then determines the actual distance ($D_{actual}$) using equation (1) above, by adjusting the measured distance ($D_{measurement}$) from A/D converter 109 using the distance error (delta D) which is based on the intensity from the integrator 110, the measured distance ($D_{measurement}$) from the distance measurement circuit, and the relationship function stored in memory 115.

As a non-limiting example, for a given detected pulse, the measured distance ($D_{measurement}$) received from the distance measurement circuit might be 51.02 meters, and its intensity received from the integrator 110 might be 212. The TV converter 108 indicates that this is in range "2", so the CPU 111 checks the distance error (delta D) with the function of FIG. 1B in memory 115 using the intensity value of 212 for a range "2" fitting. The function in FIG. 1B reveals a delta D of 0.14 meters, so that the actual distance ($D_{actual}$) is 51.02 meters minus 0.14 meters, which is 50.88 meters.

The CPU 111 has an output coupled to either of the comparator 107 or the TV converter 108 to transmit a "Start" signal to the TV converter 108 to cause the TV converter 108 to start charging. For example, the CPU 111 can be coupled directly to the TV converter 108 to start the distance measurement operation of the TV converter 108, or the CPU 111 can be coupled directly to the comparator 107 so that the comparator 107 would control both the "start" and "stop" of the TV converter 108. The CPU 111 also has an output coupled to the laser driver 103 to provide high voltage control to laser driver 103. A display 112 (such as a liquid crystal display) can be coupled to the CPU 111 to display the actual distance ($D_{actual}$).

The display 112 can also display other types of data that are relevant to the environment. For example, the velocity of the target 114 (e.g., by measuring a plurality of distance data during a period of time, and calculating the target's velocity from the CPU 111, using known methods), the brightness of the environment, the brightness of the target 114, or the temperature of the environment. Those skilled in the art will appreciate that appropriate sensors and other devices will need to be coupled to the CPU 111 and the display 112 for calculating or detecting these other environmental parameters. Many of these sensors and devices are well-known in the art (such as velocity calculators, temperature sensors, etc.) and will not be described in greater detail herein.

Some of the elements in FIG. 2 are standard elements that are found in typical laser range finders, and will not be described in further detail. Such standard elements include the regulator 101, battery 102, detector 104, preamplifier 105, amplifier 106, comparator 107, TV converter 108, A/D converter 109, and display 112.

The laser driver 103 performs several functions, including: (1) generating high voltage (HV) to provide high current to the laser diode 113 in a short period of time to cause the diode 113 to emit laser pulses, and (2) providing high voltage to detector 104 since high voltage bias will facilitate faster operation. The integrator 110 and CPU 111 together constitutes a distance error correction circuit that provides low-noise, large dynamic range, high accuracy distance. The laser driver 103 provides high voltage measurements to CPU 111, and CPU 111 provides high voltage control (i.e., acts as a voltage controller) to the laser driver 103 in the manner described below.

Figure 3:
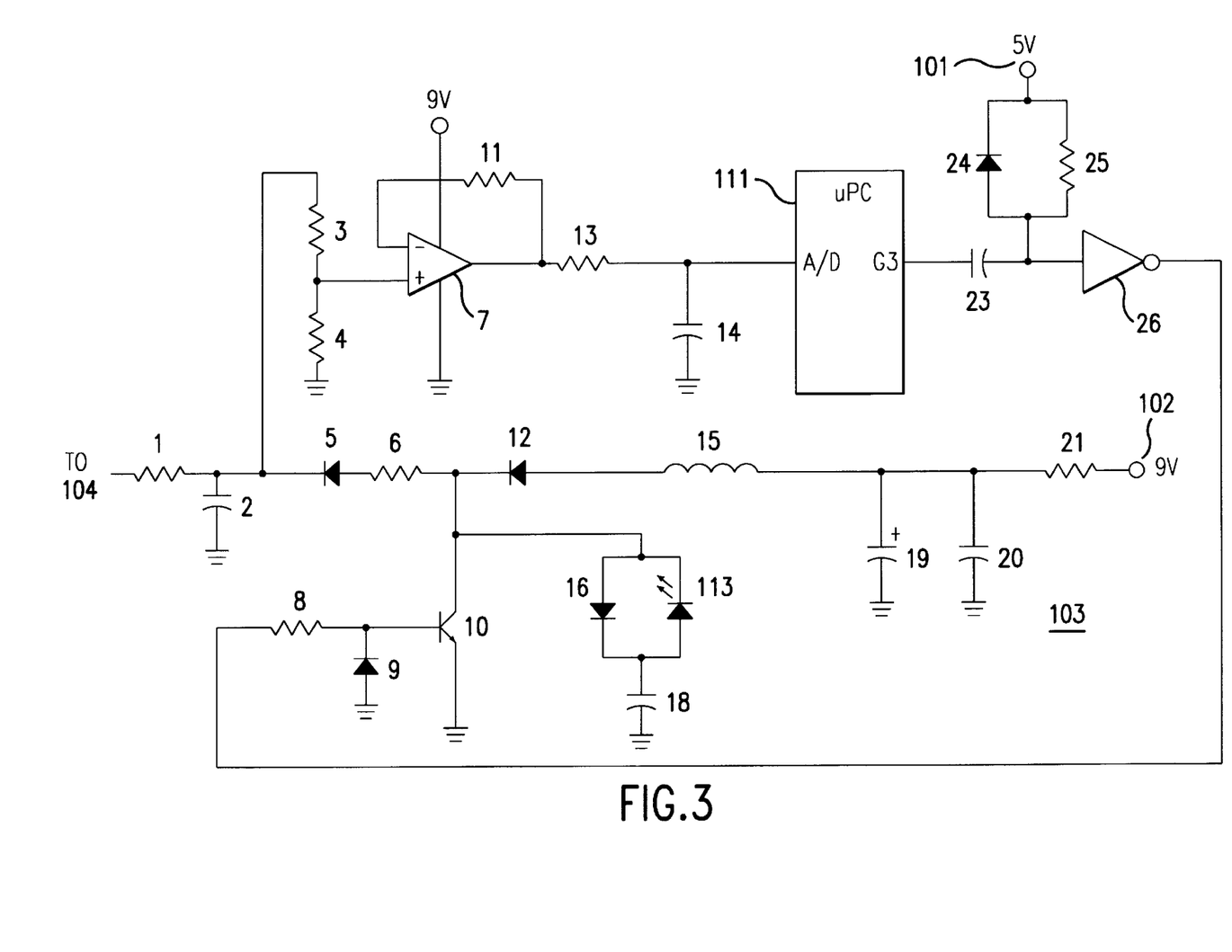
FIG. 3 is a circuit diagram of the laser driver of FIG. 2.

FIG. 3 illustrates in greater detail the electronics of the "high voltage pumping" laser driver 103 according to a non-limiting embodiment of the present invention. The battery 102 is coupled to a resistor 21, which serves to limit current and is in turn coupled to capacitors 19 and 20, and to an inductor 15. The capacitors 19, 20 serve as filter elements (by stabilizing the supplied voltage) and store electrical charge received from the battery 102. The inductor 15 serves as an energy storage and high voltage pulse generation element for supplying power. A diode 12 is coupled to the inductor 15. Diodes 12 and 16 provide a unidirectional path for charging capacitor 18, which stores the high voltage pulse energy that will eventually be converted to light at the laser diode 113. A transistor 10 has a collector electrode coupled to diode 12, and serves as a fast switching current gate. A diode 9 is coupled to the base of transistor 10 and serves to protect the transistor 10 against back voltage from capacitor 18 and diode 113. A resistor 6 and a diode 5 are coupled in series to diode 12, and together serve to supply and filter the high voltage to the CPU 111. A capacitor 2 is coupled to the diode 5 and operates to store charge for comparing and checking the voltage at capacitor 18. The high voltage is divided between resistors 3 and 4 (which are coupled to the diode 5) because the voltage would otherwise be too high. The high voltage is then provided to the CPU 111 via a buffer that includes an amplifier 7, a resistor 11 and an RC filter that is made up of resistor 13 and capacitor 14. The A/D port of CPU 111 receives the divided high voltage and calculates the high voltage. The CPU 111 varies the pulse width that is transmitted from port G3 back to transistor 10 depending upon the deviation of the high voltage from the desired set value of the high voltage. The output of port G3 is coupled to a capacitor 23, a diode 24, a resistor 25, an inverter 26 and a resistor 8, with the resistor 8 coupled to the base of the transistor 10. Capacitor 23, diode 24, resistor 25, inverter 26 and resistor 8 together serve to prevent unwanted noise from affecting the calibration signals emitted from port G3. Thus, the CPU 111 operates to raise or lower the voltage depending on the voltage received at the A/D port of CPU 111.

The operation of the laser driver 103 will now be described. The CPU 111 first checks the high voltage received at its A/D port, and performs high voltage control calculations (i.e., CPU 111 determines the "current pumping" time required to generate the new desired high voltage level). "Current pumping" means the supply of current from inductor 15 to capacitor 18. As shown in FIG. 3, capacitor 2 stores the highest voltage of capacitor 18 via the diode 5 which prevents current flow from capacitor 2 to capacitor 18. The CPU 111 receives the voltage value from capacitor 2 via the divided circuit (i.e., resistors 3 and 4), the amplifier 7, resistors 11 and 13, and the capacitor 14. Based on the received voltage value, the CPU 111 provides a control signal to transistor 10 via the capacitor 23, the diodes 9 and 24, the resistors 8 and 25, and the inverter 26, in which the transistor 10 can be turned on or off.

A "high voltage pumping circuit" is defined by the capacitors 2 and 18, diodes 5 and 12, inductor 15, battery 102, and the transistor 10. When the transistor 10 is turned on, the current in inductor 15 is transferred to the capacitor 2 by the oscillator circuit defined by the inductor 15 and the capacitor 18. The capacitor 2 receives the highest voltage of this oscillator circuit, which is the "pumping" result. The resistors 6 and 21 operate as buffers, and the capacitors 19 and 20 operate as noise filters. Because diode 16 allows current to flow into and out of the capacitor 18, the diode 113 can be connected to the capacitor 18 to use the oscillation current as the laser pulse current.

Figure 4:
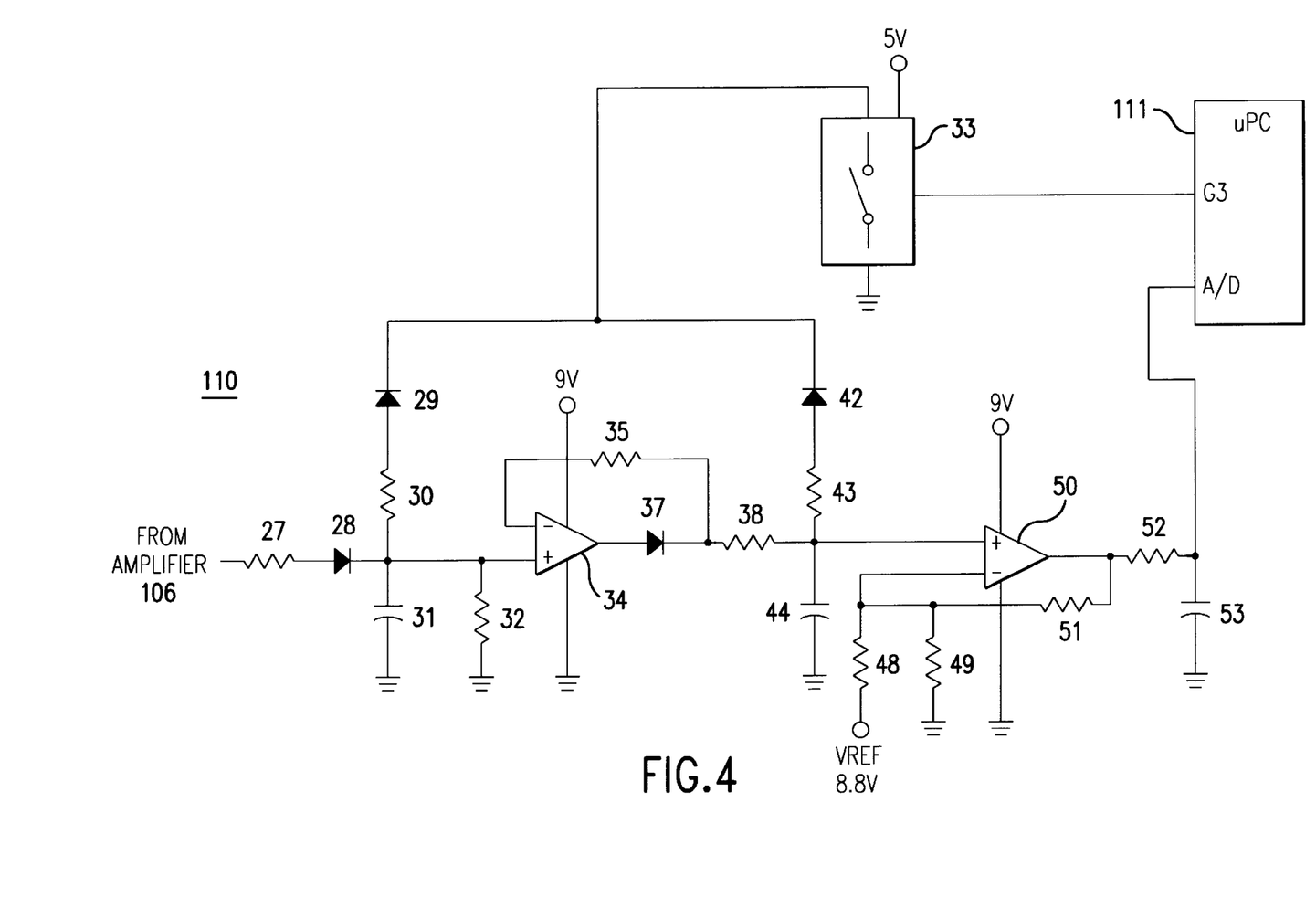
FIG. 4 is a circuit diagram of the integrator of FIG. 2.

FIG. 4 illustrates in greater detail the electronics of the integrator 110 according to a non-limiting embodiment of the present invention. The integrator 110 calculates the mathematical integral of the "pulse area" to determine the intensity of a detected pulse. This "pulse area" is the area under, for example, the curves C1 and C2 (see FIG. 1A), or I4 or I5 (see FIG. 5) that represent the detected pulse signals. Referring to FIG. 4, before any intensity measurements are performed, a switch 33 (operated by the CPU 111) is turned on to discharge first and second capacitors 31 and 44, with resistors 30 and 43 acting as the discharge buffers, respectively. After capacitors 31 and 44 have been discharged, the switch 33 is turned off and the diodes 29 and 42 then function to isolate capacitors 31 and 44, respectively, from the influence of the switch 33 and from each other. When measurement is started, the amplified pulse from amplifier 106 is input to the integrator 110 via a resistor 27 and a diode 28, and charges a first capacitor 31, which is in parallel with a resistor 32. The resistor 27, diode 28 and capacitor 31 together work as an integration circuit, which will receive the actual integration result and store it at capacitor 31. Since the charge in capacitor 31 will decrease as current passes through resistor 32, a first amplifier 34 is coupled to capacitor 31 to transfer the voltage of capacitor 31 to a second capacitor 44. The diode 37 prevents the voltage of capacitor 44 from decreasing, so that capacitor 44 will keep its maximum voltage value even if the other capacitor 31 is discharging. Resistors 35 and 38 are coupled to the first amplifier 34 to facilitate the operation of the amplifier 34. Since the magnitude of the voltage at capacitor 44 is small, a second amplifier 50 is coupled to capacitor 44 to amplify the voltage signal that is to be read by the CPU 111. This amplified voltage signal is stored in a third capacitor 53. Resistors 48 and 49 are coupled to the second amplifier 50 to adjust the reference voltage level, and resistors 51 and 52 are coupled to the second amplifier 50 to facilitate the operation of the amplifier 50. The voltage accumulated in capacitor 53 is measured by the A/D port of CPU 111 and is used to correct the distance error (delta D or delta T). After the CPU 111 has measured the voltage from capacitor 53, the switch 33 is closed to discharge the remaining charge at capacitors 31, 44, 53, after which the switch 33 is opened again to await the next detected pulse.

FIG. 5 illustrates how the distance error correction method of the present invention can be implemented. FIG. 5 shows different pulses after amplification. It is well known that the pulse density varies at least as $(1/R)^2$, with R being the distance from the laser range finder 100 (i.e., diode 113) to the target 114. Taking into account the difference in reflectivity between, for example, a corner reflector and a black body, the intensity of a detected pulse can reach detected intensity variations of a range of up to 6 orders of magnitude for a typical system operational measurement range between 1 and 100 meters. Five different received pulse intensities I1, I2, I3, I4, I5 are shown in FIG. 5, from which intensities I1, I2, I3 are at different amounts of saturation, and intensities I4, I5 are two different pulses with different rise times and durations. I5 represents a pulse of about 20 nsec duration and crosses the voltage threshold with a delay delta T relative to when pulse I1 crosses the voltage threshold. This delay delta T can be determined by calculating the integral of the pulse area of I5 to obtain the intensity of I5, and then accessing the memory 115 for the appropriate value of distance error (delta T).

Figure 6:
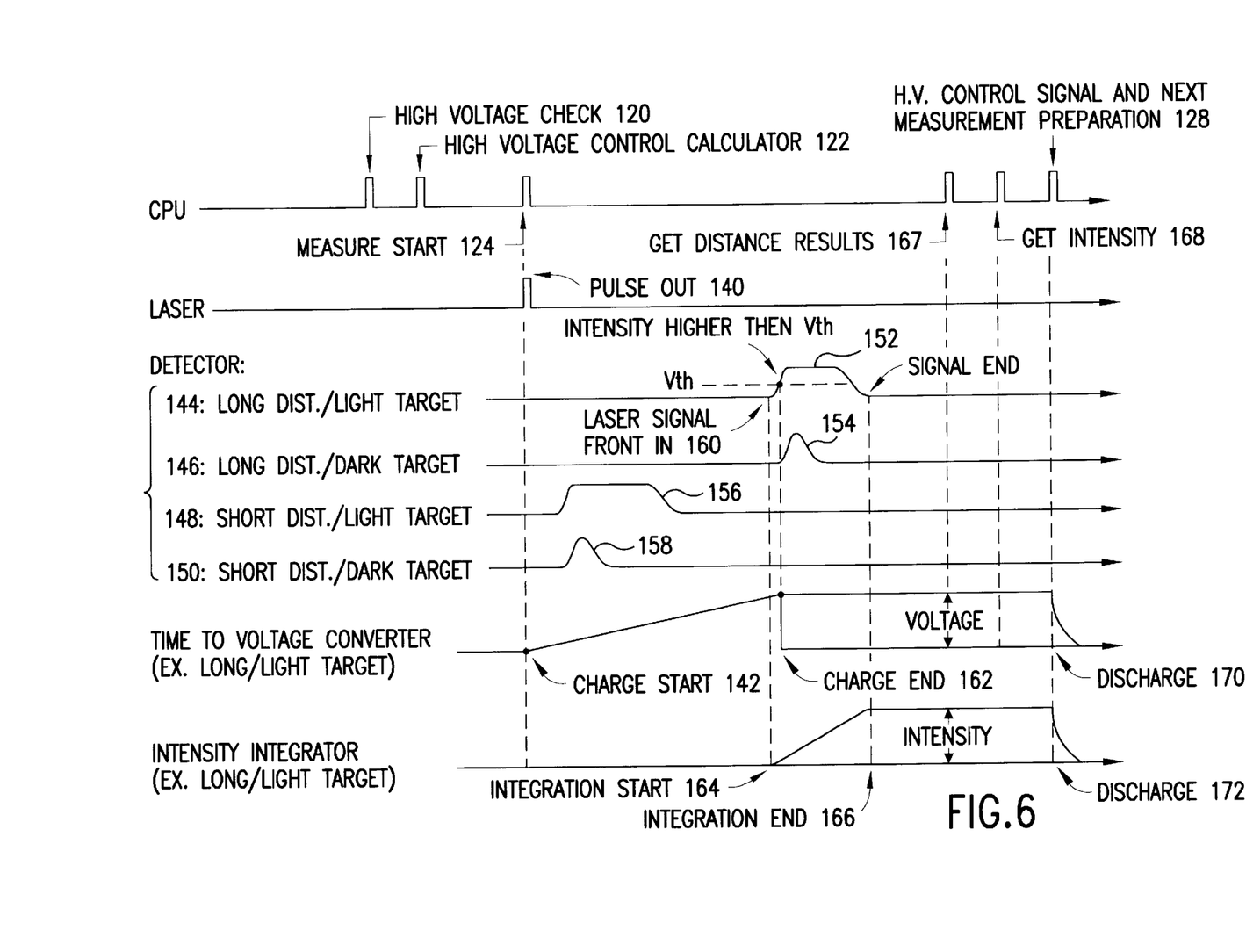
FIG. 6 is a timing diagram illustrating the operation of the laser range finder of FIG. 2.

The operation of the laser range finder 100 will now be described with reference to FIG. 6. The CPU 111 first checks the high voltage received at its A/D port (see 120 in FIG. 6), and performs high voltage control calculations 122. These two steps are the same as those described above in connection with FIG. 3. The CPU 111 then starts the time measurement. At this time, a laser pulse is emitted by the laser diode 113 (see 140 in FIG. 6), and the TV converter 108 starts to charge (see 142 in FIG. 6). As shown in FIG. 6, the target 114 can, in a simplified non-limiting example, be either (1) a long-distance, light target 144, (2) a long-distance, dark target 146, (3) a short-distance, light target 148, or (4) a short-distance, dark target 150. As shown in each of lines 144, 146, 148, 150, the detected pulses 152, 154, 156, 158, respectively, have different shapes, and arrive at different times. Depending on the arrival time of the pulse 152, 154, 156 or 158, the TV converter 108 can determine which "range" (i.e., short or long) the target 114 is located in. Assuming in this example that the actual detected pulse is pulse 152, the detector 104 receives the laser front of pulse 152 at time 160. At this time, the charging of TV converter 108 ends (see 162 in FIG. 6), and the integrator 110 begins its integration operation (see 164 in FIG. 6). After the integrator 110 completes its integration operation (see 166 in FIG. 6), the voltage from TV converter 108 is provided to the CPU 111 via the A/D converter 109 and represents the measured distance ($D_{measurement}$) (see 167 in FIG. 6), and the CPU 111 receives the intensity data from integrator 110 (see 168 in FIG. 6). The CPU 111 then calculates the actual distance by adjusting the measured distance ($D_{measurement}$) by the distance error (i.e., delta D) in memory 115 corresponding to the intensity received from integrator 110. The TV converter 108 and the integrator 110 are then discharged (see 170 and 172, respectively, in FIG. 6). High voltage pumping (see 128 in FIG. 6), as described in connection with FIG. 3, then takes over and the process repeats itself for the next target.

In one embodiment of the present invention, the amplifier 106 is set at a high amplification so that at short distances, saturation and broadening of the detected pulse is obtained.

This saturation enables the high dynamic range of the intensities to be compressed to a low dynamic range integrated pulse and measured by the integrator 110 for range correction calculation. AGCs, logarithmic amplifiers and voltage controlled amplifiers are not used since these circuits cause group delays that reduce the accuracy of the measuring circuit.

The use of the high voltage "pumping" in the present invention is beneficial because it provides the energy requirements of the laser diode 113 and the detector 104. Since the high voltage level of detector 104 will influence the gain of the detector 104, the stability of the high voltage that is provided by the CPU's 111 control of the laser driver 103 will have a positive influence on the laser pulse profile and sensitivity of the detector 104, and both will in turn have a positive influence on the delta D vs. intensity relationship of FIG. 1B, which will have a strong effect on the overall accuracy of the measurement results of the present invention.

Thus, the present invention provides a laser range finder 100 that improves the accuracy of the measured distances. In particular, the laser range finder 100 of the present invention can be used to measure longer distances using the large gain of the signal amplification system (105, 106), and by keeping the threshold voltage Vth close to the noise level which is independent to the intensity of the detected pulses.

While the description above refers to particular embodiments of the present invention, it will be understood that many modifications may be made without departing from the spirit thereof. The accompanying claims are intended to cover such modifications as would fall within the true scope and spirit of the present invention.

For example, although the present invention has been described in connection with the use of emitted and reflected laser pulses, it is possible to use the same principles of the present invention in connection with other light sources. These light sources can include "pulse-type" sources such as a pulse LED, microwave, electromagnetic wave, radiowave, or ultrasonic wave, among others, or non-pulse-type sources, such as fluorescent light. As a non-limiting example, the pulse LED light source can utilize the same circuits illustrated in FIGS. 2–4 herein.

As another non-limiting example, the reflected pulses or signals can be processed differently by the TV converter 108 and the integrator 110. For example, if a blue light is pulsed at a fluorescent object. The reflected blue light can be used by the TV converter 108, and the reflected green portion of the fluorescent light can be used by the integrator 110 for calculating the intensity.

Even though the present invention was illustrated as being used to correct or adjust a measured distance, the same principles can be used to adjust or correct a different parameter (e.g., time, voltage, peak width of the signal for the detected pulse, peak height of the signal for the detected pulse, among others) other than the distance. As a further alternative, it is possible to use two or more different relationship functions to obtain the same results, by using the unit transfer function in the CPU 111 only. For example, in addition to the delta D vs. intensity relationship shown in FIG. 1B, it is also possible for the CPU 111 to utilize this relationship with another relationship (e.g., delta V vs. intensity, or delta D vs. delta V). The use of different parameters can be implemented as follows. For example, the intensity information can be changed to "voltage from integrator 110" and "input peak width from amplifier 106", and the delta D information can be changed to "delta V for voltage from A/D converter 109" and "delta T information from TV converter 108". The parameters in FIG. 1B can be changed: the "peak intensity" can be changed to "peak current in detector 104", "peak width in amplifier 106", "voltage output of integrator 110", and the delta D can be changed to "delta V for justifying the voltage from A/D converter 109", "delta T for justifying the time results from TV converter 108."

What is claimed is:

1. A laser range finder, comprising:
    a laser diode for emitting a laser pulse to a target to produce a reflected pulse;
    a detector for receiving the reflected pulse;
    a measurement circuit coupled to the detector for determining a measured parameter based on the reflected pulse;
    an integrator coupled to the detector for determining the pulse area of the reflected pulse; and
    a processor coupled to the measurement circuit and the integrator for adjusting the measured parameter based on the pulse area of the reflected pulse.

2. The apparatus of claim 1, further including a high voltage generation circuit coupled to the detector and the processor, the high voltage generation circuit including the laser diode.

3. The apparatus of claim 2, wherein the high voltage generation circuit includes a switch that is actuated to generate current that is stored as voltage in a first capacitor, with the first capacitor coupled to the laser diode for providing voltage to the laser diode.

4. The apparatus of claim 3, wherein the high voltage generation circuit includes an oscillator circuit that charges a second capacitor, with the second capacitor storing the highest voltage value in the high voltage generation circuit and coupled to the processor to provide the highest voltage value to the processor.

5. The apparatus of claim 4, wherein the processor is coupled to the switch to vary the voltage level at the second capacitor.

6. The apparatus of claim 1, wherein the parameter is distance, and the measurement circuit is a distance measurement circuit.

7. The apparatus of claim 6, wherein the distance measurement circuit includes:
    a comparator coupled to the detector for distinguishing the reflected pulse from environmental noise;
    a time to voltage converter coupled to the comparator for determining an approximate range of the target; and
    an analog to digital converter having an input coupled to the time to voltage converter, and an output coupled to the processor.

8. The apparatus of claim 1, further including an amplification system coupled between the detector and the measurement circuit.

9. The apparatus of claim 8, wherein the amplification system includes a pre-amplifier and an amplifier.

10. The apparatus of claim 1, further including a display coupled to the processor for displaying the actual value of the measured parameter.

11. The apparatus of claim 1, wherein the determined pulse area is used to determine the intensity of the reflected pulse, the apparatus further including a memory for storing adjusted parameter errors corresponding to different intensities.

12. The apparatus of claim 11, wherein the parameter is distance, and wherein the processor adjusts the measured distance with a distance error corresponding to the intensity of the reflected pulse, to provide the actual distance.

13. The apparatus of claim 1, wherein the integrator includes a capacitor whose voltage represents the intensity of the reflected pulse.

14. A method of determining the distance from an apparatus to a target, comprising:

emitting a laser pulse to a target to produce a reflected pulse;

detecting the reflected pulse;

determining a measured distance based on the detected pulse;

determining the pulse area of the detected pulse; and adjusting the measured distance based on the pulse area of the detected pulse.

15. The method of claim 14, further including the step of:

determining the intensity of the detected pulse based on the determined pulse area of the detected pulse.

16. The method of claim 15, further including:

storing adjusted distance errors corresponding to different intensities; and adjusting the measured distance with a distance error corresponding to the intensity of the reflected pulse.

17. The method of claim 15, wherein the intensity of the detected pulse is determined by calculating the integral of the pulse area of the detected pulse.

* * * * *